Figure 1:
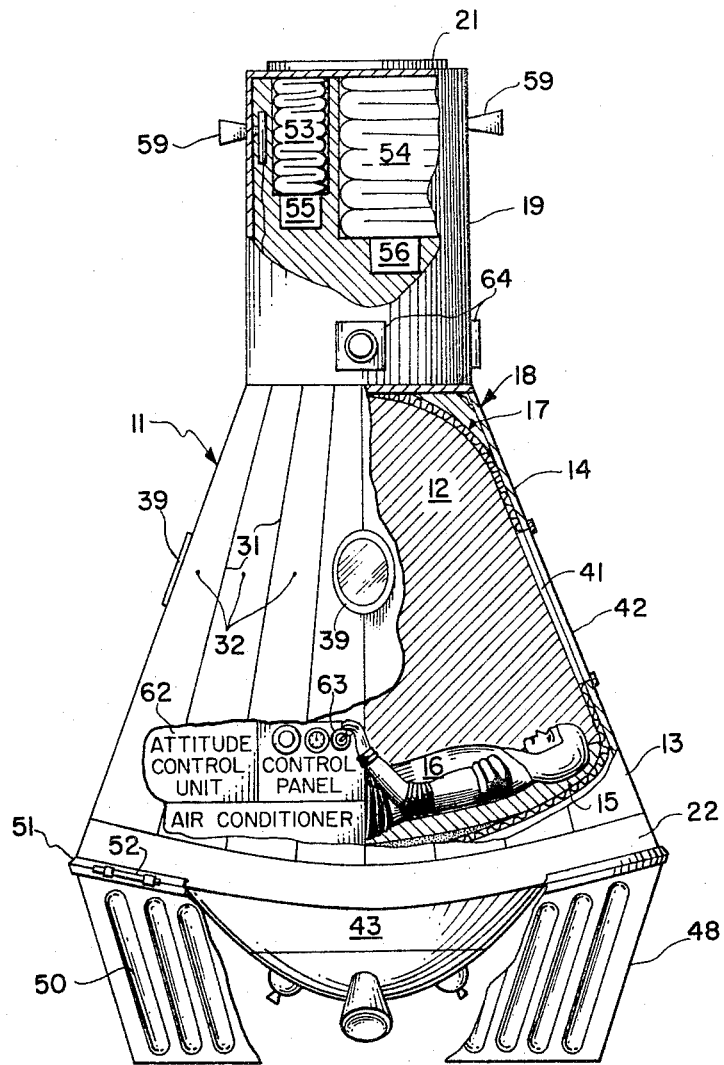

INVENTORS
M.A. FAGET   W.S. BLANCHARD, JR.
A.J. MEYER, JR.   A.B. KEHLET
R.G. CHILTON   J.B. HAMMACK
C.C. JOHNSON, JR.

BY

ATTORNEYS

Sept. 6, 1966     M. A. FAGET ET AL     3,270,908
SPACE CAPSULE

Original Filed Oct. 16, 1959     3 Sheets-Sheet 2

INVENTORS
M.A. FAGET     W.S. BLANCHARD, JR.
A.J. MEYER, JR.     A.B. KEHLET
R.G. CHILTON     J.B. HAMMACK
C.C. JOHNSON, JR.

BY

ATTORNEYS

Sept. 6, 1966   M. A. FAGET ET AL   3,270,908
SPACE CAPSULE
Original Filed Oct. 16, 1959   3 Sheets-Sheet 3
FIG. 4
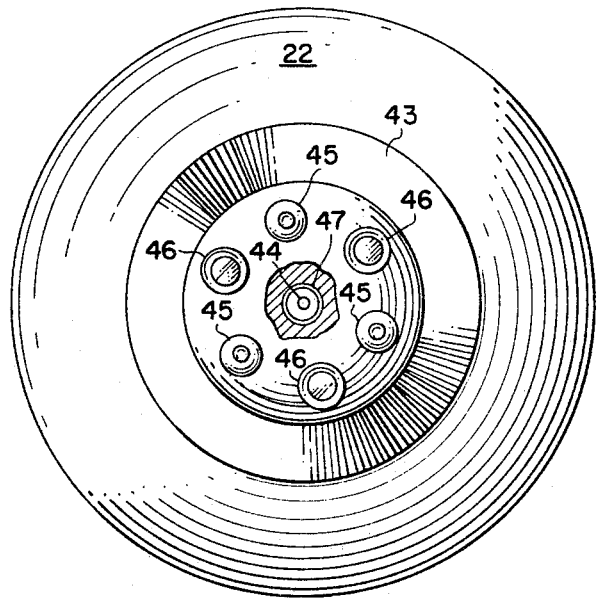
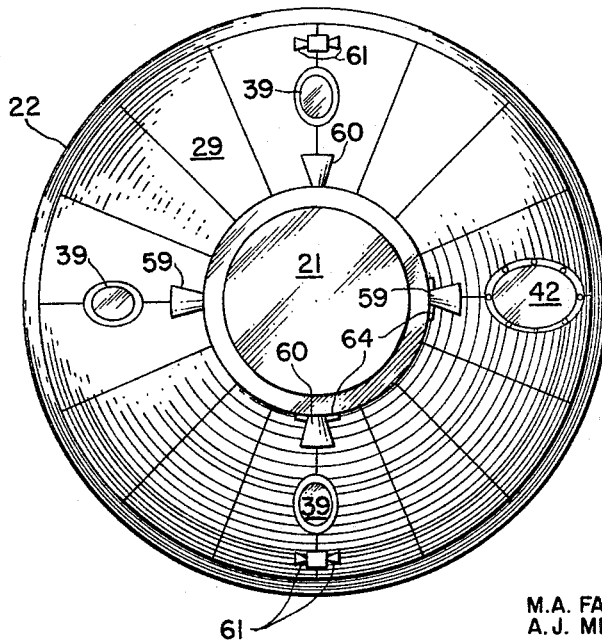
FIG. 5
INVENTORS
M.A. FAGET     W.S. BLANCHARD, JR.
A.J. MEYER, JR.   A.B. KEHLET
R.G. CHILTON   J.B. HAMMACK
C.C. JOHNSON, JR.
BY
ATTORNEYS United States Patent Office 3,270,908
Patented Sept. 6, 1966

3,270,908
SPACE CAPSULE
Maxime A. Faget and Andre J. Meyer, Jr., Newport News, Robert G. Chilton, Seaford, Willard S. Blanchard, Jr., and Alan B. Kehlet, Hampton, and Jerome B. Hammack and Caldwell C. Johnson, Jr., Newport News, Va., assignors to the United States of America as represented by the Administrator of the National Aeronautics and Space Administration
Original application Oct. 16, 1959, Ser. No. 847,023, now Patent No. 3,093,346, dated June 11, 1963. Divided and this application Dec. 13, 1962, Ser. No. 250,974
3 Claims. (Cl. 220—15)

The invention described herein may be manufactured and used by or for the Government of the United States of America for governmental purposes without the payment of any royalties thereon or therefor.

This application is a division of application Serial Number 847,023, filed October 16, 1959, now Patent Number 3,093,346.

This invention relates generally to space vehicles, and more particularly to a manned capsule configuration capable of being launched into orbital flight and returned to the earth's surface.

As an initial step in determining man's ability to adapt to and perform during space travel, a study of the effects of a space environment upon a human occupant of a capsule placed into a semi-permanent orbit about the earth has been proposed. In order to quickly achieve the desired manned orbital flight a simple and reliable non-lifting capsule configuration which can be lifted into orbit by a missile motor and which follows a ballistic reentry path has been proposed.

Accordingly, it is an object of the present invention to provide a novel space satellite capable of achieving orbital flight.

Another object of this invention is to provide a simple and lightweight non-lifting type of manned space capsule capable of being launched into a semi-permanent orbital flight and returned to the earth's surface.

Still another object of the instant invention is the provision of an aerial capsule configuration exhibiting a high degree of aerodynamic stability and structural integrity during the launching, orbiting and reentry phases of its flight trajectory.

A further object of the instant invention is to provide a space vehicle which provides protection for its occupant from the deleterious effects of large pressure differentials, high temperatures, micrometeorite collisions, high level acoustical noise, and severe inertial and impact loads.

A still further object of this invention is to provide a satellite capable of being selectively oriented while in flight.

Still another object of the instant invention is the provision of a new and improved micrometeorite, heat, and load sustaining enclosure structure for a space capsule.

According to this invention, the foregoing and other significant objects are attained by a frustro-conical shaped capsule provided with divers propelling means, aerodynamic drag means, and environmental shielding means.

Figure 2:
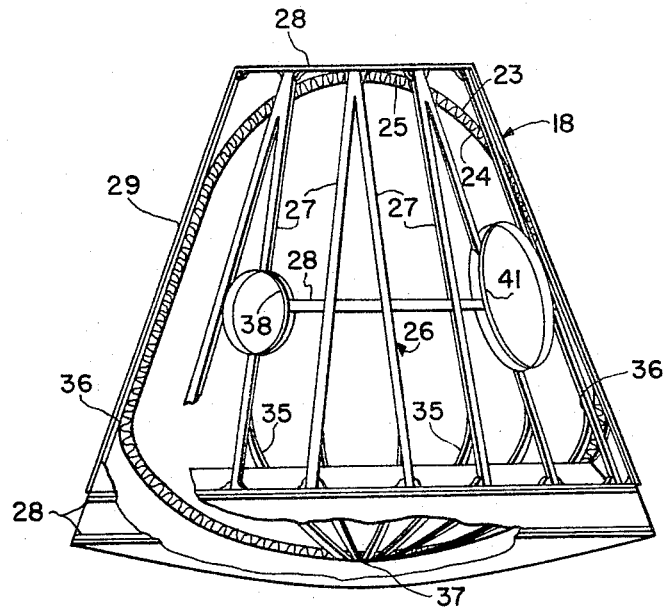
Figure 3:
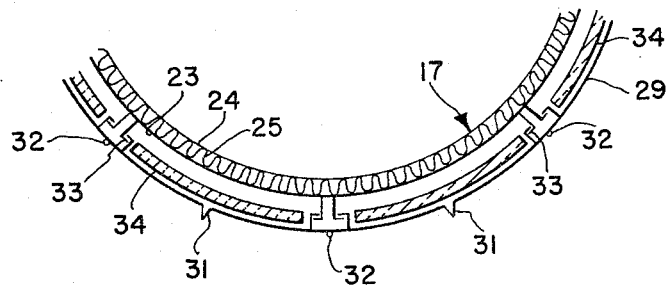

A more complete appreciation of the invention and many of the attendant advantages thereof will be readily apparent as the same becomes better understood by reference to the following detailed description when considered in connection with the accompanying drawings wherein:

FIG. 1 is an elevational view, partly broken away, of the overall space capsule in accordance with the instant invention;
FIG. 2 is an elevational view of the structural framework of the space capsule of FIG. 1;
FIG. 3 is a detailed view of a portion of the capsule shell structure;
FIG. 4 is a bottom view of the space capsule;
FIG. 5 is a top view of the space capsule.

Referring now to the drawings wherein like reference numerals designate identical or corresponding parts throughout the several views, and more particularly to FIG. 1 whereon the space capsule according to the present invention is generally indicated by the reference numeral 11 and is shown as consisting of a man-sized compartment 12 having an extremely blunt forebody 13 and a frusto-conical afterbody 14. A contour couch 15, of the type disclosed in the copending application of Maxime A. Faget et al., Serial Number 840,983, filed September 18, 1959, now Patent Number 3,038,175, for supporting an occupant 16 may be securely placed in a low position within the forebody portion 13 of the compartment, or cabin 12. A low couch position is preferred to keep the center of gravity of the capsule 11 as close to the blunt end thereof as possible thereby to maintain a high degree of aerodynamic and hydrodynamic stability of the capsule.

The cabin 12 is formed of a sealed inner shell 17 which provides a pressure vessel for survival of the occupant 16, and a circumscribing separate outer structure 18. The outer structure 18 functions as a load carrying framework and, additionally, as a heat and micrometeorite shield for the pressure vessel 17. The contour of the outer structure 18 of the capsule is such as will provide a positive static stability for the overall capsule configuration throughout a reentry angle of attack range of approximately 0 to 180 degrees. Fixedly positioned atop the narrow afterbody 14 is an upright cylindrical canister 19 having a top cover plate 21 thereon. The entire underside surface of the blunt forebody 13, which is the leading reentry surface of the capsule, is covered by a heat protector member 22 for reducing the amount of heat applied to the pressure vessel 17. The member 22 may be composed either of a heat sink material, such for example as beryllium, or of an ablation heat shield material, such for example as glass-reinforced plastic.

As more clearly shown in FIG. 2, the inner shell 17 consists of a sandwich material of two metallic plates 23 and 24, which may be of stainless steel, or the like, separated by a honeycomb stiffener 25. The outer structure 18 is formed of a rigidly interconnected framework 26 of relatively closely spaced longitudinal stringer members 27 and transverse ring members 28. An external skin 29, preferably a continuous sheet of high temperature and heat resistant material, such for example as International Nickel's metal alloy Inconel or other suitable metal alloy, covers the framework 26. To prevent thermal buckling of the external skin 29 by high frictional heating, omnidirectional expansion of the skin is provided for. One arrangement for accomplishing this result is shown in FIG. 3 wherein a number of longitudinal pleats 31 are formed in the skin to take up any expansion in the transverse direction and longitudinal expansion is allowed by rigidly securing the skin to the framework at only one intermediate position, such for example as along points 32 of a circumferential line, FIG. 1, atop a ring member 28. The points 32 are intermediate of adjacent stringer members 27. All other connections between the skin and framework of the outer structure 18 are made with slide clamps 33 engaging the stringer members 27. To further reduce heat and acoustic noise transmission to the cabin 12, bats of a suitable insulating material 34, such for example as Johns-Manville's thermal insulation Thermoflex, or the like, are placed in the space between the inner and outer shells. A basket configuration formed of a number of flexible metallic bands 35 one end of each of which is secured, as at 36, to individual stringers 27 and the other ends of which are commonly joined as at 37 provides a non-rigid support for the base of inner shell 17 within the outer structure 18. By this elastic support arrangement, the entire load sustained by the space capsule 11 will be borne entirely by the framework 26 and no stresses will be transmitted to the pressure vessel 17 to possibly rupture the air tightness thereof. To further assure the pressure integrity of the cabin 12, the inner and outer structures are provided with individual corresponding observation ports 38 and 39, respectively, and hatches 41 and 42, respectively.

As shown in FIG. 4, a circular container, or package, 43 is secured to the underside of heat shield 22 by an explosive bolt 44. The container houses three equidistantly spaced posigrade rockets 45 and three equidistantly spaced retrograde rockets 46, the purpose of each of which rockets will be more fully described hereinafter. The rockets are canted at a small angle to direct the thrust of the rockets through the center of gravity of the capsule 11. A compression coil spring 47 is included in the container 43 to force the container away from the capsule subsequent to the ignition of the explosive bolt 44. A lightweight pedestal 48 is detachably secured to the base of the capsule 11 for adapting the capsule to be seated upon the nose of a launching rocket motor, not shown. The adapter 48 may be composed of titanium material and stiffened by a plurality of longitudinal corrugations 50 formed therein. A segmented clamp ring 51 having one or more explosive bolts 52 disposed along its periphery normally secures the pedestal 48 to the capsule base.

In order to decelerate and stabilize the capsule during reentry, a drogue parachute 53 and a landing parachute 54 are stowed in the canister 19, as shown in FIG. 1. The drogue parachute 53 is preferably of the ribbon type and is ejected along with cover plate 21 from the canister 19 by a mortar 55 into the airstream during the initial reentry period. The landing parachute 54 is preferably of the ringsail type and is adapted to be deployed subsequent to the deployment of the drogue parachute 53 by mortar 56. The shroud lines, or harnesses of the parachutes are detachably secured (not shown) to the framework 26 of the outer shell 18. In order to protect the parachute material from the deleterious effects of friction generated heat the canister 19 is preferably provided with a layer of heat insulating material.

For the purpose of properly orienting the capsule during the orbital and reentry phases of its flight, and also to eliminate tumbling thereof during the reentry phases, a reaction generating system consisting of a number of minute jets, preferably of the type utilizing a hydrogen peroxide fuel, are placed along the upper peripheral region of canister 19 and along the lower peripheral region of the cabin forebody 13, as more clearly shown in FIGS. 1 and 5 of the drawings. The upper row of jets consists of two pairs of jets 59 and 60 perpendicularly positioned relative to each other. The torque developed by jets 59 varies the pitch of the capsule while the torque developed by jets 60 varies the yaw of the capsule. The lower row of jets consists of a pair of jets 61 on diametrically opposite sides of the capsule and develop a torque which controls the roll of the capsule.

The operation of the minute torque jets 59, 60 and 61 can be regulated by selectively opening or closing feed valves (not shown) individual to each of the jet nozzles either by manually operated control means 16, or automatically by a stabilization and attitude control system 62. For manual control, the occupant can be provided with a hand control stick 63 which he selectively moves while observing the earth's surface through the observation ports of the cabin until the capsule assumes a desired orientation relative to the earth. For automatic operation, an attitude control system 62 may be provided which consists essentially of conventional vertical (roll pitch) and directional (roll yaw) gyros (not shown) for providing attitude information to a conventional calibrator (not shown) which in response to information provided by two horizon scanning devices 64 protruding from the canister 19 develops suitable output signals for controlling the operation of the reaction generating system to properly orient the capsule 11. In order to stop tumbling during the reentry phase of the capsule's trajectory, the control system 62 may also include a conventional three-axis rate gyro package (not shown) which is maintained inoperative while the capsule is orbiting. It is to be understood that although an attitude and stabilization control system similar to a conventional aircraft autopilot has been described, this description is only by way of example and not limitation, and other conventional control systems, such for example as an inertial navigation system, may also be employed. It is also to be understood that ignition of explosive bolts 44, 51, rockets 45, 46 and mortars 55, 56 can be regulated by the occupant's manual operation of a control panel, or unit, or the control panel may be provided with a conventional programmer for effecting a preselected sequential mode of ignitions.

For the purpose of providing a better understanding of the capsule of the present invention, the operation thereof during a normal flight trajectory will now be described.

At blastoff, the capsule 11 is carried skyward by the launching motor not shown until at a predetermined altitude, or velocity, suitable for orbital injection, the explosive bolts 52 are fired and the pedestal clamp ring 51 separated. Concurrently therewith, the posigrade rockets 45 are fired thereby to separate the capsule 11 from the launching motor. The attitude control system 62 immediately orients the capsule to a desired orbital attitude position with the blunt forebody 13 upward and leading and the occupant 16 sitting down with the earth below. While the capsule is in orbit, the desired capsule alignment can be maintained by operation of the minute torque jet nozzles 59, 60 and 61, in response to the control signals developed by the attitude and stabilization control system 62. When reentry into the earth's atmosphere is desired, the retrograde rockets 46 are fired, thereby reducing the forward capsule velocity to an amount less than necessary to keep it in orbit. The explosive bolt 44 is then ignited and the package 43 jettisoned from the capsule forebody by the action of compression spring 47. The torque producing jet nozzles are then operated either manually or automatically to orient the capsule 11 to the proper reentry attitude; i.e., heat shield 22 as the leading surface. When the capsule has descended to a preselected altitude, mortar 55 is fired and the drogue parachute 53 deployed. During this portion of the capsule reentry, oscillations of the capsule may be damped by the operation of the torque jet nozzles in response to the action of the three-axis rate gyro package of the attitude and stabilization control system 62. When the velocity of the capsule 11 has been suitably decreased by atmospheric drag, drogue parachute 53 is jettisoned and the main landing parachute 54 deployed by mortar 56 thereby to slowly lower the capsule to the earth's surface for recovery. Upon landing, the main parachute 54 may be jettisoned. If the touchdown point is on water, the low center of gravity characteristic of the capsule design will result in a high hydrodynamic stability and the capsule will retain an upright position. As described hereinbefore, the load stress forces accompanying reentry and impact are transmitted to the load carrying outer structure 18 to thereby prevent stresses being directly transmitted to the pressure vessel 17 supported internally therein.

Obviously, there are numerous modifications and variations of the present invention apparent to those skilled in the art in the light of the above teachings. It is therefore to be understood that within the scope of the appended claims the invention may be practiced otherwise than as specifically described.

What is claimed as new and desired to be secured by Letters Patent of the United States is:

1. In combination with a sealed vessel and a protective covering therefor, the improvement therewith comprising: a framework having a plurality of rigidly interconnected longitudinal and transverse beam members surrounding said sealed vessel, said longitudinal beam members being rigidly connected to the sealed vessel, a thin unitary sheet of material in engagement with and encompassing said framework, said sheet of material having the physical property characteristic of being heat-resistant and omnidirectionally expandable when subjected to a high temperature environment, means permitting said omnidirectional expansion while maintaining said sheet in protective covering relationship about said sealed vessel, said means including a plurality of longitudinally disposed expandable pleats formed in said sheet at spaced intervals, clamp means slidably attaching said sheet to said longitudinal beam members, and means for rigidly attaching selected points of said sheet to an intermediate one of said transverse beam members.

2. A capsule casing construction comprising an enclosure formed of two substantially parallel spaced thin metallic plates having a stiffening core material disposed therebetween, a framework composed of a plurality of rigidly interconnected vertical and horizontal beam members surrounding said enclosure, said vertical beam members being in supporting contacting relationship with portions of the outer one of said metallic plates, a continuous thin sheet of metallic material conformingly encircling said framework, said sheet being attached at spaced points to an intermediate one of said horizontal beam members along one entire horizontal plane thereof, clamps secured to said sheet for slidably connecting said sheet at selected points to said vertical beam members, and basket means for elastically supporting said enclosure within said framework, said basket means being formed of a plurality of metallic bands one end of each of which is commonly joined together exteriorly adjacent said enclosure and the other ends of which are rigidly secured to individual ones of said vertical beam members.

3. In combination, a sealed vessel and a protective housing therefor,
said sealed vessel being formed of two substantially parallel spaced thin metallic plates having a stiffening core therebetween,
a shock absorbing framework of substantially the same conforming shape being disposed about and elastically supporting said vessel,
said framework including,
   (a) a plurality of vertical stringers rigidly interconnected with
   (b) a plurality of horizontal beam members, and
   (c) basket means disposed internally and adjacent one end of said vertical stringers,
      said basket means being formed of a plurality of metallic bands one end of which is commonly joined together at a point located substantially on a plane taken along an axis of said vessel and the other ends of said bands being rigidly secured to individual ones of said vertical stringers, and unitary thermal protection means encompassing said framework.

References Cited by the Examiner

UNITED STATES PATENTS

| | | | |
|---|---|---|---|
| 1,799,234 | 4/1931 | Huff. | |
| 2,020,630 | 11/1935 | Anderson | 220—63 |
| 2,100,309 | 11/1937 | Bender | 220—15 |
| 2,260,393 | 10/1941 | McCarthy | 220—63 |
| 2,323,297 | 7/1943 | Collins | 220—63 |
| 2,684,171 | 7/1954 | Ernst | 220—15 |
| 2,928,565 | 3/1960 | Glasoe | 220—15 |

THERON E. CONDON, *Primary Examiner.*

J. R. GARRETT, *Examiner.*